Patented Aug. 5, 1941

2,251,610

UNITED STATES PATENT OFFICE 2,251,610

MANUFACTURE OF EMBEDDING MASSES

Alex Röst-Grande, Leverkusen I. G. Werk, Germany, assignor to Winthrop Chemical Company, Inc., New York, N. Y., a corporation of New York No Drawing. Application June 8, 1938, Serial No. 212,517. In Germany June 17, 1937

3 Claims. (Cl. 22—188)

This invention relates to the manufacture of embedding masses containing gypsum especially for dental purposes.

It is a known fact that the setting time and the expansion of gypsum and embedding masses containing gypsum can be influenced by the addition of many materials including salts of inorganic and organic acids.

Thus it has been proposed to add to embedding masses, for instance, borates, quicklime, potassium and sodium sulfates and citrates and also organic acids and carbohydrates. It is also known that ammonium salts decrease the setting time of gypsum without admixtures; but it was not known how the expansion is influenced. Whilst potassium salts scarcely increase the expansion on setting and the thermal expansion of embedding masses, but sometimes even decrease them, the best results have been attained with free organic acids and carbohydrates. When using organic acids often a bubble formation caused by decomposition of the calcium carbonate contained in the gypsum may be observed. By the addition of carbohydrates a reduction of the calcium sulfate may be caused with carbonisation of the carbohydrate.

In accordance with the present invention the last-mentioned disadvantages are avoided and the properties of embedding masses comprising the customary ingredients and mainly consisting of gypsum and silicious materials are improved by the addition of ammonium salts of inorganic acids. Especially diammonium phosphate can suitably be employed as addition; as suitable ammonium salts there come further into consideration, for instance, ammonium chloride, nitrate, sulfate and pyrophosphate.

Though also additions of ammonium salts displaying an alkaline reaction when dissolved in water such as ammonium carbonate or bicarbonate yield good results as to expansion and bubble formation it has proved advantageous to use neutrally reacting ammonium salts in order to obtain setting times which are best adapted to the practical requirements.

The ammonium salts can be added to the solid ingredients of the embedding mass or to the liquid with which the solid components are made into a paste. By the addition of the aforementioned ammonium salts the expansion on setting and especially the thermal expansion of the embedding mass containing gypsum is increased to a far-reaching extent when compared with the effect attained by the addition of the corresponding alkali metal salts. This effect could not be foreseen because the alkali metal salts in part increase and in part decrease the expansion. Contraction of embedding masses containing gypsum which are admixed with ammonium salts of inorganic acids, is not observed even when heating the mass above 800° C.; such contraction is caused on adding sodium salts, apparently because of a sintering process.

The setting time of the embedding masses containing gypsum is above all considerably accelerated by using ammonium nitrate; the hardness of the new embedding masses is not decreased either after setting or after heating, when compared with that of embedding masses containing gypsum without additions of ammonium salts.

Embedding masses containing gypsum and additions according to this invention are advantageously distinguished from certain known embedding masses in that metals are less affected on moulding and that the casting can easily be loosened from the mould.

The properties of such embedding masses as contain semi-hydrate gypsums are particularly improved. An addition of ammonium salts of inorganic acids to embedding masses as described in British patent specification No. 412,988 has proved to be particularly suitable. Such embedding masses are characterized by a content of a semihydrate gypsum with the following physical characteristics:

"Weight by volume 'loosely put in' above 0.9 gram per cc. and 'shaken in' above 1.45 grams per cc., 'strewed-in quantity' until a paste capable of being poured is attained, at least 230 grams per 100 ccs., and thickest consistency at least 300 grams per 100 ccs."

Besides plaster of Paris and ammonium salts of inorganic acids the embedding mass according to the invention contains as silicious material for instance one or more of the different modifications of $SiO_2$ such as quartz, tridymite or cristobalite. Also sand or other silicates such as clay or kaolin may be present. Further the embedding mass may contain substances of constant volume for instance chamotte or substances accelerating or retarding the setting time. Other customary additions are for instance coloring substances.

The embedding mass according to the invention is made into a paste with water and the model is embedded therein in the usual way.

The following tests give a comparison showing to what extent the ammonium salts of inorganic acids and the alkali metal salts of these acids influence the expansion on setting and the thermal-expansion of embedding masses containing gypsum. An embedding mass of the following constitution was used, the parts being by weight:

| | Parts |
|---|---|
| Quartz powder | 800 |
| Semi-hydrate gypsum with the physical properties set forth in claim 1 of British specification No. 412,988 | 312 |
| Plaster of Paris | 120 |

2.3 parts of the mass were made into a paste with 1 part of water. The expansion on setting and the thermal expansion of this mass were examined with and without the addition of 1% of the following compounds:

| Addition | Expansion on setting | Thermal expansion at 800° C. |
|---|---|---|
| | Percent | Percent |
| Ammonium chloride | 0.5 | 0.65 |
| Ammonium nitrate | 0.74 | 1.06 |
| Diammonium phosphate | 0.88 | 1.06 |
| Sodium chloride | 1.47 | 0.94 |
| Potassium chloride | 0.75 | 0.88 |
| Sodium nitrate | 0.44 | 0.66 |
| Potassium nitrate | 0.88 | 0.74 |
| Di-sodium phosphate | 0.54 | 0.53 |
| | 0.2 | 0.7 |

While I have described my improvements in great detail and with respect to preferred embodiments thereof, I do not desire to limit myself to such details or embodiments, since many modifications and changes may be made and the invention embodied in widely different forms without departing from the spirit or scope of the invention in its broadest aspects. Hence I desire to cover all modifications and forms without the scope or language of any or more of the appended claims.

I claim:

1. An embedding mass comprising diammonium phosphate in addition to the customary solid ingredients and mainly consisting of plaster of Paris and siliceous materials.

2. An embedding mass comprising an ammonium phosphate in addition to the customary solid ingredients which mainly consist of plaster of Paris and siliceous materials.

3. An embedding mass comprising an ammonium pyrophosphate in addition to the customary solid ingredients which mainly consist of plaster of Paris and siliceous materials.

ALEX RÖST-GRANDE.